Jan. 24, 1928. 1,656,966
L. P. WEINLE
DIRIGIBLE HEADLIGHT
Filed July 1, 1926 2 Sheets-Sheet 1
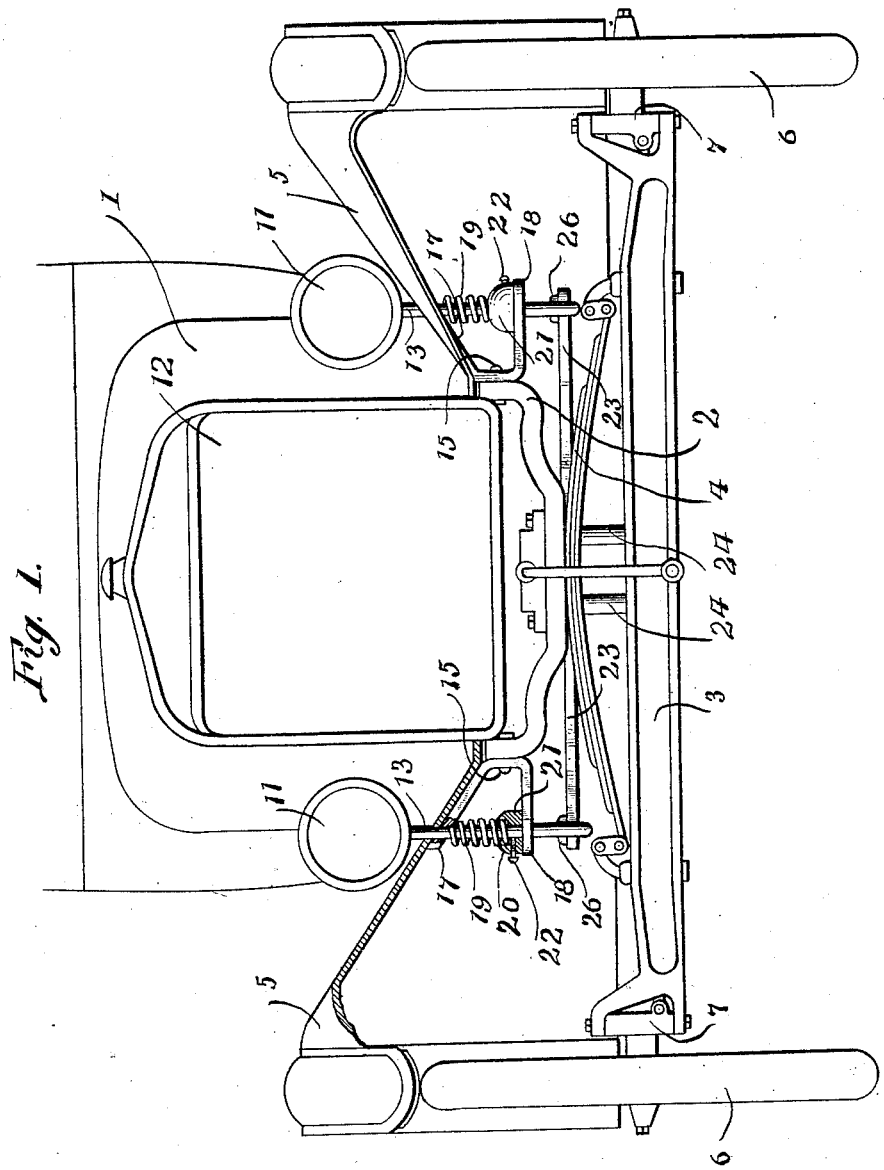
Inventor
L.P. Weinle
By Lacey & Lacey, Attorneys Jan. 24, 1928.　　　　　　L. P. WEINLE　　　　　　1,656,966
DIRIGIBLE HEADLIGHT
Filed July 1. 1926　　　　2 Sheets-Sheet 2

Inventor
L. P. Weinle
By Lacey & Lacey, Attorneys

Patented Jan. 24, 1928.

1,656,966

UNITED STATES PATENT OFFICE.

LEWIS P. WEINLE, OF FOREST DALE, BRANDON, VERMONT.

DIRIGIBLE HEADLIGHT.

Application filed July 1, 1926. Serial No. 119,941.

This invention relates to vehicle headlights and more particularly to dirigible headlights adapted to be mounted at opposite sides of an automobile at its front and turned simultaneously with the front wheels.

One object of the invention is to so mount the headlight that the body portion of the vehicle may vibrate vertically without the headlights or their actuating mechanism being damaged.

Another object of the invention is to provide a headlight mounting including vibration absorbing springs, the tension of which may be adjusted according to the vibration to be absorbed.

Another object of the invention is to provide the headlights with improved actuating means which may be operatively connected with the tie rod of the steering mechanism of an automobile and very effectively control turning of the headlights.

This invention is illustrated in the accompanying drawings, wherein

Figure 1 is a view showing an automobile in front elevation with the improved dirigible headlights applied thereto;

Figure 3:
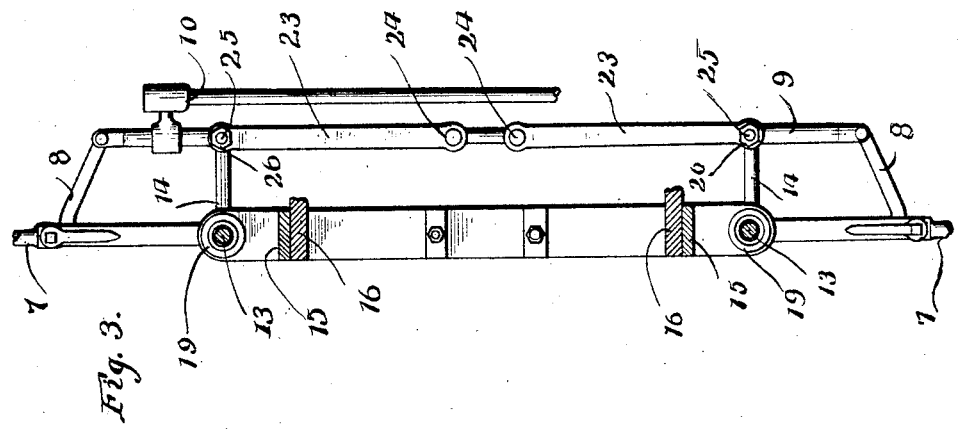
Fig. 3 is a fragmentary sectional view illustrating the actuating mechanism for the headlights and its connection with the tie rod of the steering mechanism.
Figure 2:
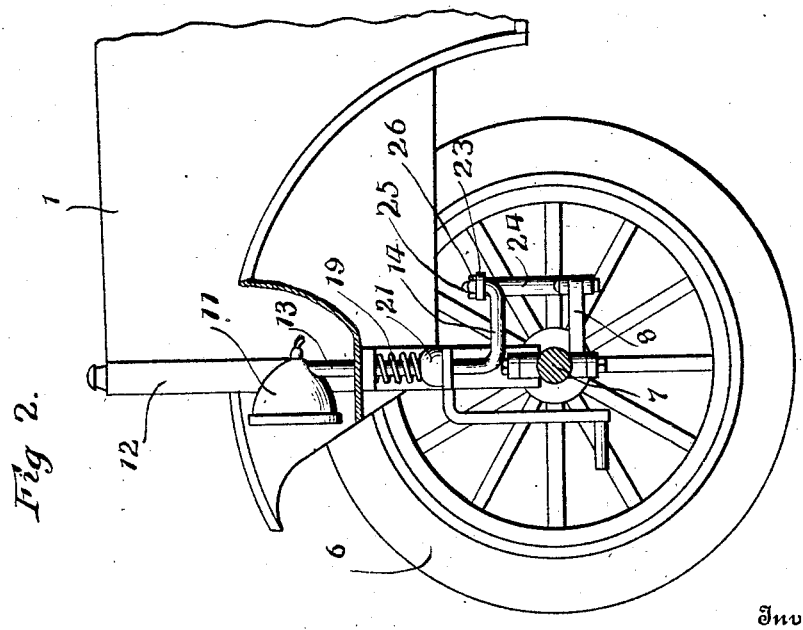
Fig. 2 is a view showing the forward portion of the automobile partially in side elevation and partially in section and provided with the improved headlights.

The automobile which is indicated in general by the numeral 1 is of a conventional construction and includes a chassis 2, the forward portion of which is supported above the front axle 3 by the usual springs 4. The mud guards 5 extend from the sides of the chassis in operative relation to the front wheels 6 which are mounted in the usual manner upon spindles 7 pivotally connected with the end portions of the front axle and provided with the usual turning arms 8 which project rearwardly and are connected by a tie rod 9. The steering mechanism which is indicated in general by the numeral 10 is connected with the tie rod in the usual manner so that the tie rod may be moved longitudinally and the spindles simultaneously turned when guiding the automobile.

The headlights 11 are disposed at opposite sides of the radiator 12 and each is provided with a depending standard 13 which projects downwardly through an opening in a mud guard 5 and has its lower portion bent to provide a rearwardly extending actuating arm 14. Brackets 15 are firmly secured to the chassis bars 16 at opposite sides of the automobile and each is provided with upper and lower arms 17 and 18 which are formed with alined openings to rotatably and slidably receive a headlight standard. From an inspection of Fig. 1, it will be seen that the upper arms extend in close contacting engagement with the under faces of the mud guards 5 and, therefore, the brackets will serve to brace the mud guards as well as constituting bearing brackets for the headlight standards. Springs 19 are coiled about the headlight standards between the upper and lower arms of the brackets and each spring has its lower end seated in a pocket 20 formed in a collar 21. The collars 21 fit loosely upon the headlight standards and carry set screws 22 so that they may be adjusted vertically upon the standards and firmly secured by the set screws with the springs held under predetermined tension. It will thus be seen that, when the body portion of the automobile vibrates vertically while moving over rough roads, the standards of the headlights may slide freely through the openings of the mud guards and bearing brackets and vibration will not be transmitted to the headlights.

In order to control the headlights and cause them to be retained in alinement with the front wheels and turn simultaneously therewith, there has been provided links or rods 23 which extend longitudinally above the tie rod 9 and at their inner ends are secured to posts 24 which project downwardly and are rigidly secured to the tie rod. At their outer ends the rods or bars 23 are formed with openings through which the upturned end portions 25 of the arms 14 project and these upturned end portions of the arms are threaded and carry securing nuts 26 which serve to retain the bars 23 in engagement with the turning arms but permit the turning arms to have pivotal movement with respect to the actuating rods. From an inspection of Fig. 3, it will be apparent that, when the tie rod is moved longitudinally to turn the front wheels of the automobile, swinging movement will be imparted to the turning arms 14 and the headlight standards will be rotated and turn the headlights in the direction in which the front wheels are turned. Therefore, the headlights will always be disposed in the direction in which the automobile is to move and a roadway will be well lighted. There will be no danger of the operating mechanism being damaged by vibration as the standards slide freely through the bearing brackets and jolting of the body portion is not transmitted to the standard or operating mechanism.

Having thus described the invention, I claim:

In combination with a vehicle including a chassis frame, mud guards extending from the sides of the chassis frame, pivotally mounted wheel spindles having turning arms, and a steering gear including a tie rod connecting said turning arms, brackets extending from opposite sides of the chassis frame and having upper and lower bearing arms, the upper arms engaging the under face of the mud guards to support and brace the mud guards, lamps above the mud guards, depending standards for said lamps extending through openings in the mud guards and rotatably and slidably mounted in said bearing arms and having rearwardly extending actuating arms at their lower ends, posts extending upwardly from said tie rod intermediate its length, rods connected with said posts and extending towards the ends of the tie rod above the same and pivotally connected with said actuating arms to impart turning movement to the lamps when the wheel spindles are turned, and means yieldably resisting longitudinal sliding of the lamp standards in one direction.

In testimony whereof I affix my signature.

LEWIS P. WEINLE. [L. S.]